United States Patent
Hannes et al.

(10) Patent No.: US 10,780,902 B2
(45) Date of Patent: Sep. 22, 2020

(54) RAIL VEHICLE DRIVE WITH A BRAKE DEVICE

(71) Applicant: SIEMENS AKTIENGESELLSCHAFT, München (DE)

(72) Inventors: Manfred Hannes, Zwiesel (DE); Bernd Pfannschmidt, Rosstal (DE)

(73) Assignee: SIEMENS MOBILITY GMBH, Munich (DE)

( * ) Notice: Subject to any disclaimer, the term of this patent is extended or adjusted under 35 U.S.C. 154(b) by 452 days.

(21) Appl. No.: 15/526,433

(22) PCT Filed: Nov. 4, 2015

(86) PCT No.: PCT/EP2015/075666
§ 371 (c)(1),
(2) Date: May 12, 2017

(87) PCT Pub. No.: WO2016/075002
PCT Pub. Date: May 19, 2016

(65) Prior Publication Data
US 2018/0297617 A1    Oct. 18, 2018

(30) Foreign Application Priority Data
Nov. 14, 2014 (EP) .................................. 14193241

(51) Int. Cl.
*B61H 9/00* (2006.01)
*B61H 5/00* (2006.01)
(Continued)

(52) U.S. Cl.
CPC ............. *B61H 9/006* (2013.01); *B60T 1/065* (2013.01); *B61C 3/00* (2013.01); *B61H 5/00* (2013.01);
(Continued)

(58) Field of Classification Search
CPC .. B60T 1/062; B61C 3/00; B61C 9/38; B61H 5/00
See application file for complete search history.

(56) References Cited

U.S. PATENT DOCUMENTS 1,783,269 A * 12/1930 Apple ..................... B61C 9/46
                                                                    105/54
2,846,600 A *  8/1958 Potter ..................... H02K 9/06
                                                                    310/61
(Continued)

FOREIGN PATENT DOCUMENTS

DE        25 23 500 A1    12/1976
DE        2601516 A1       7/1977
(Continued)

*Primary Examiner* — Jason C Smith
(74) *Attorney, Agent, or Firm* — Henry M. Feiereisen LLC

(57) ABSTRACT

A drive of a rail vehicle includes two drive wheels and a wheel set shaft which connects the drive wheels for rotation about an axis. A dynamoelectric machine includes a shaft extending axially parallel to the wheel set shaft and mounted for rotation about a further axis. A transmission connects the shaft of the dynamoelectric machine and the wheel set shaft by a non-positive fit. Placed between the dynamoelectric machine and the transmission is a coupling which is configured for direct attachment of a brake disk of a braking apparatus which is arranged between the transmission and the dynamoelectric machine.

15 Claims, 2 Drawing Sheets

(51) Int. Cl.
  *B60T 1/06*  (2006.01)
  *F16D 55/00*  (2006.01)
  *B61C 3/00*  (2006.01)
  *H02K 7/102*  (2006.01)
  *H02K 7/116*  (2006.01)

(52) U.S. Cl.
  CPC ............ *F16D 55/00* (2013.01); *H02K 7/102* (2013.01); *H02K 7/116* (2013.01)

(56) References Cited

U.S. PATENT DOCUMENTS

| | | | |
|---|---|---|---|
| 5,325,939 A | 7/1994 | Schwendt | |
| 7,411,323 B2 | 8/2008 | Pfannschmidt et al. | |
| 7,555,988 B2 | 7/2009 | Pfannschmidt | |
| 7,714,467 B2 | 5/2010 | Pfannschmidt | |
| 7,812,486 B2 | 10/2010 | Pfannschmidt | |
| 9,109,631 B2 | 8/2015 | Pfannschmidt | |
| 9,866,086 B2 * | 1/2018 | Pfannschmidt | B61C 9/44 |
| 2004/0011578 A1 * | 1/2004 | Hoffmann | B61C 9/38 |
| | | | 180/218 |
| 2007/0120428 A1 * | 5/2007 | Pfannschmidt | B61C 9/38 |
| | | | 310/61 |
| 2010/0307370 A1 | 12/2010 | Rodet | |
| 2016/0072354 A1 | 3/2016 | Pfannschmidt | |
| 2018/0297617 A1 * | 10/2018 | Hannes | B60T 1/065 |

FOREIGN PATENT DOCUMENTS

| | | | | |
|---|---|---|---|---|
| DE | 91 16 159 U1 | 3/1992 | | |
| DE | 41 37 233 A1 | 5/1993 | | |
| DE | 195 04 766 C2 | 10/1997 | | |
| DE | 201 11 110 U1 | 11/2001 | | |
| DE | 101 16 657 C1 | 11/2002 | | |
| DE | 10116657 C1 * | 11/2002 | ............... | B61C 9/50 |
| DE | 10303874 A1 * | 9/2004 | ............... | B60T 1/062 |
| DE | 2010 020 981 A1 | 11/2011 | | |
| EP | 0 007 021 A1 | 1/1980 | | |
| EP | 0 054 134 A1 | 6/1982 | | |
| EP | 03018616 A2 | 3/1989 | | |
| EP | 0542173 A1 | 5/1993 | | |
| EP | 0 645 294 A1 | 3/1995 | | |
| EP | 0645294 A1 * | 3/1995 | ............... | B60T 1/062 |
| EP | 1 197 412 A2 | 4/2002 | | |
| GB | 1 212 962 A | 11/1970 | | |
| GB | 1212962 A * | 11/1970 | ............... | B60T 1/062 |
| JP | H0443155 A | 2/1992 | | |
| JP | H08253149 A | 10/1996 | | |
| JP | H09283242 A | 10/1997 | | |
| RU | 2192979 C2 | 11/2002 | | |
| SU | 1248874 A | 8/1988 | | |

* cited by examiner

RAIL VEHICLE DRIVE WITH A BRAKE DEVICE

CROSS-REFERENCES TO RELATED APPLICATIONS

This application is the U.S. National Stage of International Application No. PCT/EP2015/75666, filed Nov. 4, 2015, which designated the United States and has been published as International Publication No. WO 2016/075002 A1 which claims the priority of European Patent Application, Serial No. 14193241.8, filed Nov. 14, 2014, pursuant to 35 U.S.C. 119(a)-(d).

BACKGROUND OF THE INVENTION

Rail vehicle drives are positioned in bogies, wherein by means of a wheel set shaft the drive wheels connected thereto are driven. In rail vehicles with drives in the axle region, the accommodation of brake devices is almost impossible for reasons of space, in particular if an inexpensive but overhanging form of an axle-supported transmission with a motor fixed to the bogie is to be used.

Conventionally, the brake disks were situated in the drive wheels and the braking devices encompassed them. Alternatively thereto, the brake disks were arranged on the wheel set shaft between the transmission and the drive wheel. These arrangements each occupied an unacceptable amount of space between the drive wheels.

With so-called inside-bearing bogies in which the wheel set shaft of the drive wheels is mounted on the inside of the drive wheels, the space conditions are extremely confined. The arrangements of a braking apparatus described above are thus no longer possible.

From DE 195 04 766 C2, there is known a partially spring-loaded drive for electrically-powered vehicles, having a large gear which, including an encapsulating transmission housing, is mounted on the wheel axle and a pinion which is mounted in the transmission housing, wherein the coupled motor is fixedly fastened to the bogie and the fastening of the transmission housing to the bogie is effected resiliently elastically by means of at least two elastic spring elements mounted almost vertically and diametrically opposed to the pinion axis on the bogie.

A disadvantage therein is that the space conditions permit no room for the arrangement of a braking apparatus.

Proceeding therefrom, a person skilled in the art is faced with the problem of providing a bogie with a drive which, given the confined space conditions, enables a sufficient arrangement of braking equipment, particularly in inside-bearing bogies.

SUMMARY OF THE INVENTION

The solution to the problem as described is achieved with a drive of a rail vehicle with two drive wheels rotating about an axis and connected by means of a wheel set shaft, a shaft of a dynamoelectric machine, said shaft rotating about a further axis, being arranged axially parallel, the wheel set shaft and the shaft being connected in a non-positive fit by means of a transmission, at least one braking apparatus being arranged between the transmission and the dynamoelectric machine.

The braking apparatus is now advantageously situated on the comparatively rapidly rotating shaft of the dynamoelectric machine or the input shaft of the transmission. It is herein positioned in the space existing between the dynamoeletric machine and the transmission.

Thus, in one embodiment of a bogie, the wheel set shaft can now be configured with an inside bearing which simplifies the design of a bogie of this type.

However, it is in principle also possible to provide such a braking apparatus in an outside-bearing mounted wheel set shaft of a bogie. In this way, space is created between the drive wheels which is used, for example, for a motor of the same diameter but axially longer and thus enables the use of a more powerful motor. Given the same drive power of the motor, however, it can also be configured with a smaller diameter, but axially longer.

In order to obtain such an advantageously compact construction, the dynamoelectric machine, that is, the drive motor of a rail vehicle is, for example, designed in the stator with tooth-wound coils which have a relatively low axial overhang of the end windings.

The transmission is advantageously configured as a gearwheel transmission, in particular a single-stage spur gearing, in order to utilize the existing space conditions in the bogie optimally and to conduct the torque highly efficiently to the wheel set shaft.

Advantageously, a coupling is provided between the transmission and the motor shaft, which can compensate for both an axial and/or a radial and/or an angular offset of the motor shaft and the transmission input shaft on installation and/or operation of the drive.

The brake disk can herein be directly fastened onto parts of the coupling which transmits the torque from the motor shaft to the transmission and thereby permits a relative movement between the motor and the transmission.

Alternatively thereto, the brake disk is fastened directly to the shaft between the dynamoelectric machine and the coupling or to the input shaft of the transmission, between the coupling and the transmission.

The braking devices themselves are fastened to the housing of the dynamoelectric machine and/or to the housing of the transmission in order to be able to support the braking torque to be applied.

Advantageously, the brake disk can be provided with a suitable design, for example, a ventilator-like construction which at least assists the ventilation of the dynamoelectric machine and/or the transmission.

According to the invention, an extremely compact, efficient drive is now provided which is installable, above all, in bogies with an inside-bearing wheel set shaft.

BRIEF DESCRIPTION OF THE DRAWINGS

The invention and further advantageous embodiments thereof will now be described in greater detail by reference to an exemplary embodiment; in the figures.

DETAILED DESCRIPTION OF THE EMBODIMENTS

Figure 1:
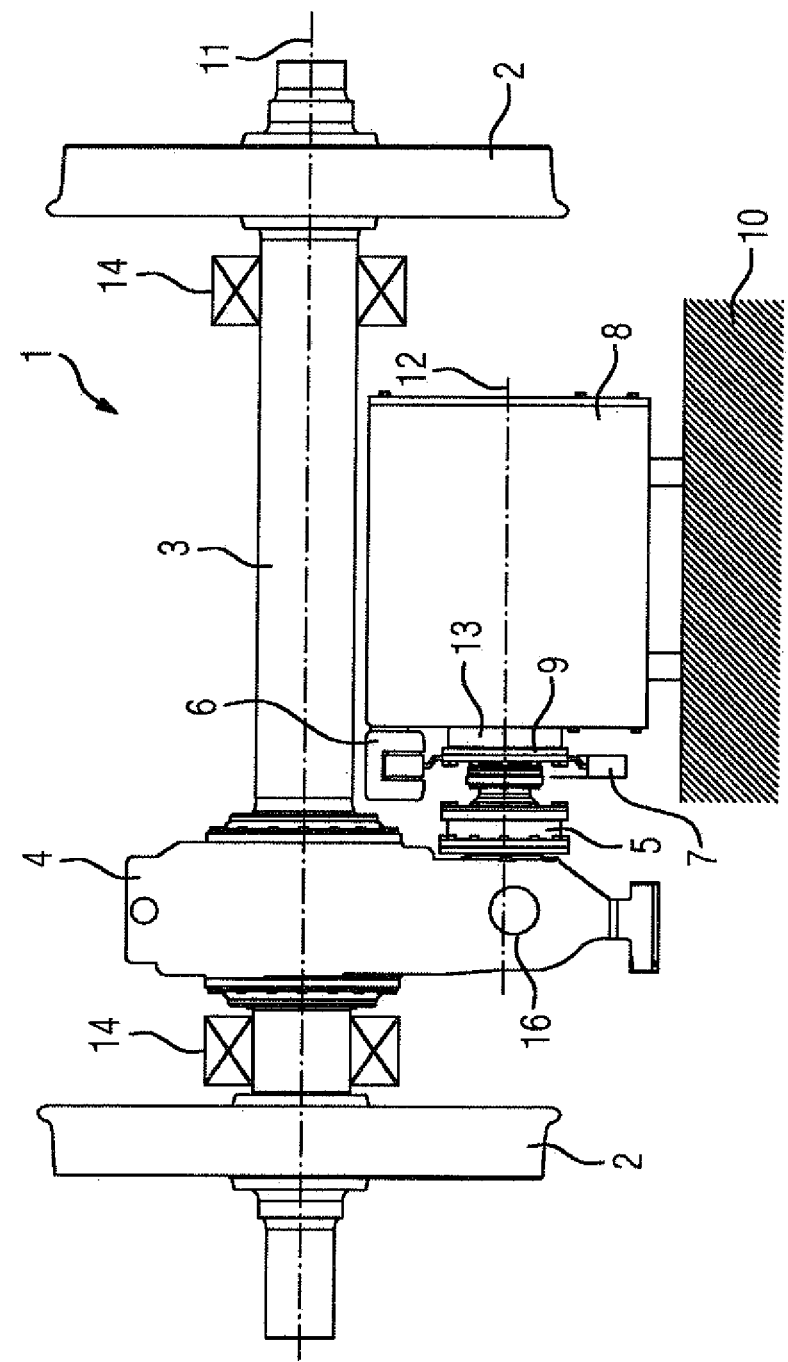
FIG. 1 shows a drive with an inside-bearing mounted bogie.

FIG. 1 shows a drive 1 of a bogie, for example, of a traction vehicle or a locomotive (not shown in detail) in plan view, wherein two drive wheels 2 are connected by a wheel set shaft 3, mounted rotatably about an axis 11. The bearings 14 are herein arranged within the two drive wheels 2. The wheel set shaft 3 is herein driven by means of a transmission 4, wherein the transmission 4 is constructed by means of a large gear which encompasses the wheel set shaft and is connected thereto for conjoint rotation, and a pinion which is situated substantially in axial extension of the axis 12 of a motor shaft 13.

Provided between the pinion and the motor shaft 13 is at least one coupling 5, 9, which can compensate for both an axial and/or a radial and/or an angular offset of the motor shaft 13 and the transmission input shaft on installation and/or operation of the drive. Ideally, the axis 12 of the motor shaft 13 and the axis of the transmission input shaft align axially.

Advantageously, the transmission 4 is configured as a single-stage cylindrical gear transmission in order to utilize optimally the space conditions between the drive wheels 2.

The motor shaft 13 and the transmission input shaft are connected to one another by one or more couplings 5, 9—not shown in this case. The braking apparatus 6 is herein space-savingly arranged either on the motor side and/or on the transmission side. A braking effect comes about in that, by means of a braking impulse of a control device, the braking apparatus 6 presses brake pads against the brake disk 7 and so initiates a braking process. Herein, a braking torque is caused which is conducted via the couplings 5, 9 and the pinion to the large gear of the transmission 4 and thereby brakes the wheel set shaft 3. The braking torque is supported against the motor housing or the transmission housing which are each mechanically connected to the bogie 10. The motor 8 itself is mounted by suitable devices to the bogie 10.

The transmission housing is supported, particularly in the region of its pinion, by means of elastic spring elements, on the bogie 10. The spring elements can be mechanically connected, for example, by means of a C-bracket to the bogie 10.

Advantageously, the brake disk can be constructed, in particular in the region of the motor shaft 13 close to the axis, such that an internal ventilation of the motor 8 is at least assisted thereby.

Figure 2:
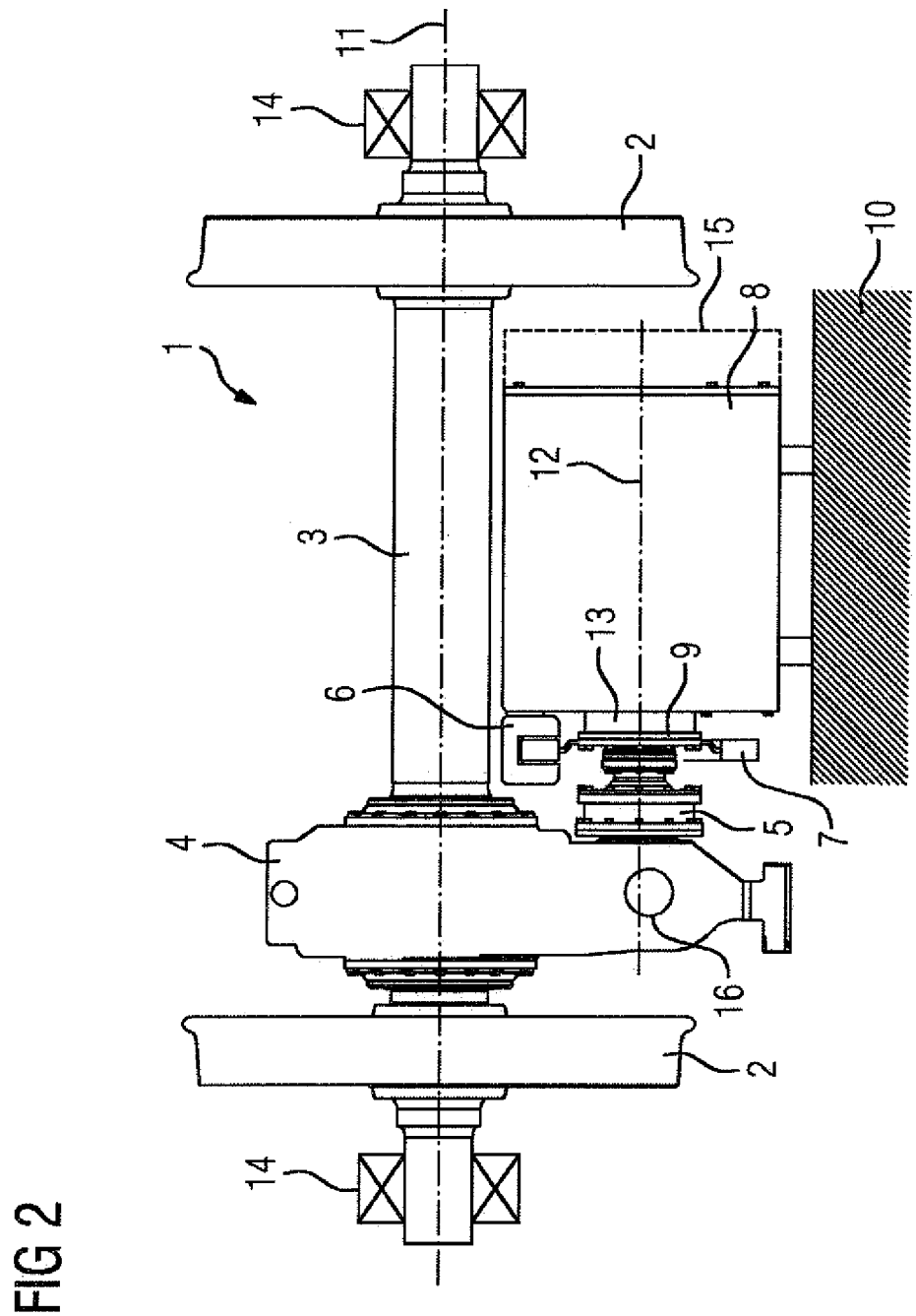
FIG. 2 shows a drive with an outside-bearing mounted bogie.

FIG. 2 shows a further drive 1 in plan view, wherein two drive wheels 2 are also connected by a wheel set shaft 3, mounted rotatably about an axis 11. The bearings 14 are herein arranged outside the two drive wheels 2 and supported on the bogie 10 (not shown in detail). Otherwise, the construction of the drive of FIG. 2 matches that of the drive of FIG. 1. The arrangement of the brake device 6 and its control is also identical.

Also notable is that, with an otherwise identical arrangement of the drive, structural space 15 has been gained, particularly with the outside-bearing mounted bogie 10, and can prove advantageous for a larger, that is, axially longer drive between the two drive wheels 2.

In the context of redundancy, two or more brake devices 6 which, in particular, have their own control device, are to be provided between the motor 8 and the transmission input side.

The invention claimed is:

1. A drive of a rail vehicle, said drive comprising:
two drive wheels;
a wheel set shaft connecting the drive wheels for rotation about an axis;
a dynamoelectric machine including a shaft extending axially parallel to the wheel set shaft and mounted for rotation about a further axis;
a transmission configured to connect the shaft of the dynamoelectric machine and the wheel set shaft by a non-positive fit;
a coupling placed between the dynamoelectric machine and the transmission; and
a braking apparatus arranged between the transmission and the coupling or between the coupling and the dynamoelectric machine, said braking apparatus including a brake disk directly fastened to the coupling.

2. The drive of claim 1, further comprising a bearing assembly arranged between the drive wheels for support of the wheel set shaft.

3. The drive of claim 1, further comprising a bearing assembly arranged outside the drive wheels for support of the wheel set shaft.

4. The drive of claim 1, wherein the transmission is configured as a gearwheel transmission.

5. The drive of claim 1, wherein the transmission is configured as a single-stage spur gearing.

6. A bogie, comprising a drive; said drive comprising two drive a wheel set, shaft connecting the drive wheels for rotation about an axis, a dynamoelectric machine including a shaft extending axially parallel to the wheel set shaft and mounted for rotation about a further axis, a transmission configured to connect the shaft of the dynamoelectric machine and the wheel set shaft by a non-positive fit, a coupling placed between the dynamoelectric machine and the transmission, and a braking apparatus arranged between the transmission and the coupling or between the coupling and the dynamoelectric machine, said braking apparatus including a brake disk directly fastened to the coupling.

7. The bogie of claim 6, wherein the drive includes a bearing assembly arranged between the drive wheels for support of the wheel set shaft.

8. The bogie of claim 6, wherein the drive includes a bearing assembly arranged outside the drive wheels for support of the wheel set shaft.

9. The bogie of claim 6, wherein the transmission is configured as a gearwheel transmission.

10. The bogie of claim 6, wherein the transmission is configured as a single-stage spur gearing.

11. A rail vehicle, comprising a bogie, said bogie comprising a drive, said drive comprising two drive wheels, a wheel set shaft connecting the drive wheels for rotation about an axis, a dynamoelectric machine including a shaft extending axially parallel to the wheel set shaft and mounted for rotation about a further axis, a transmission configured to connect the shaft of the dynamoelectric machine and the wheel set shaft by a non-positive fit, a coupling placed between the dynamoelectric machine and the transmission, and a braking apparatus arranged between the transmission and the coupling or between the coupling and the dynamoelectric machine, said braking apparatus including a brake disk directly fastened to the coupling.

12. The rail vehicle of claim 11, wherein the drive includes a bearing assembly arranged between the drive wheels for support of the wheel set shaft.

13. The rail vehicle of claim 11, wherein the drive includes a bearing assembly arranged outside the drive wheels for support of the wheel set shaft.

14. The rail vehicle of claim 11, wherein the transmission is configured as a gearwheel transmission.

15. The rail vehicle of claim 11, wherein the transmission is configured as a single-stage spur gearing.

* * * * *

UNITED STATES PATENT AND TRADEMARK OFFICE
CERTIFICATE OF CORRECTION

PATENT NO. : 10,780,902 B2
APPLICATION NO. : 15/526433
DATED : September 22, 2020
INVENTOR(S) : Manfred Hannes and Bernd Pfannschmidt It is certified that error appears in the above-identified patent and that said Letters Patent is hereby corrected as shown below:

On the Title Page

On page 2 Item [56] FOREIGN PATENT DOCUMENTS:
Replace "EP 03 018 616 A2" with the correct --EP 0 308 616 A2--.
Replace "JP H09 283 242 A" with the correct --JP H09 263 242 A--.
Correct the publication date of "SU 1248874 A 08/1988" to read --08/1986--.

In the Claims

In Column 4 Claim 6, Line 20:
Replace "two drive a wheel set, shaft connecting" with --two drive wheels, a wheel set shaft connecting--.

Signed and Sealed this
Tenth Day of November, 2020

Andrei Iancu
*Director of the United States Patent and Trademark Office*